Aug. 19, 1941.　　　　E. C. TANNER　　　　2,253,404
SUBMERSIBLE ELECTRIC MOTOR
Filed June 30, 1939
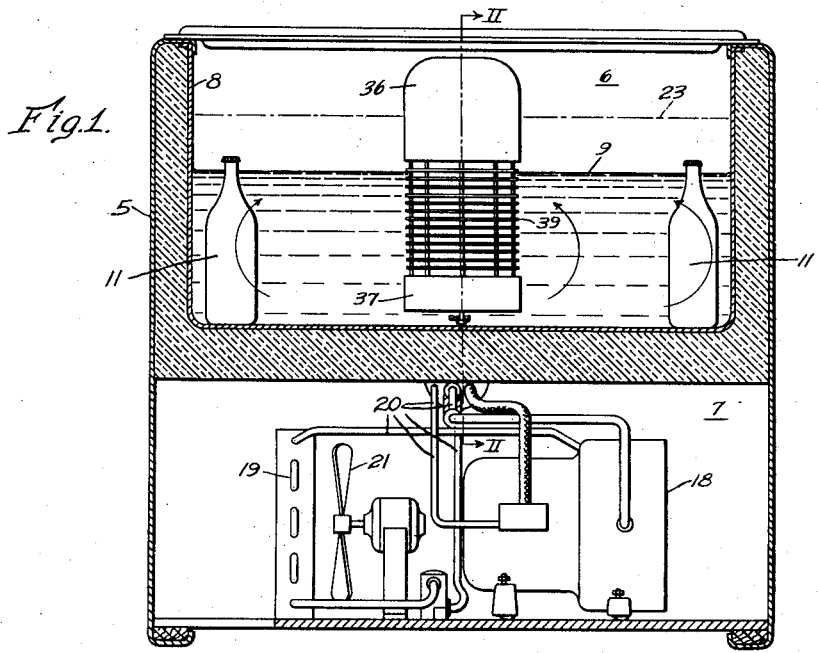
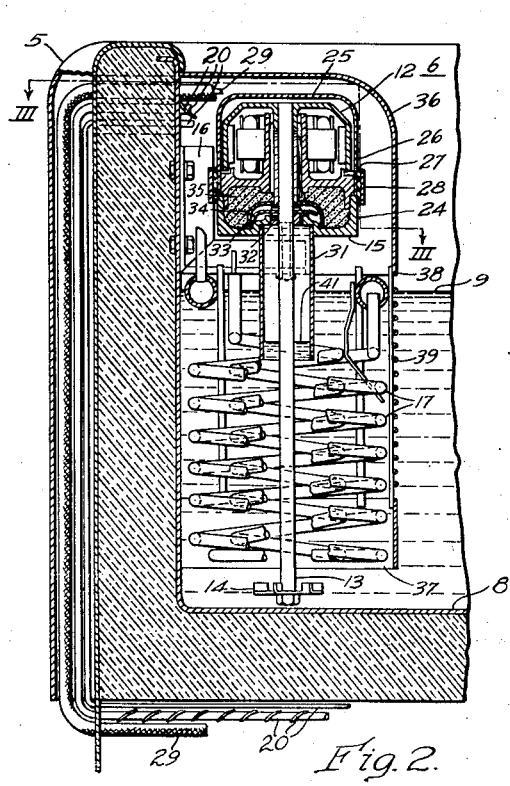
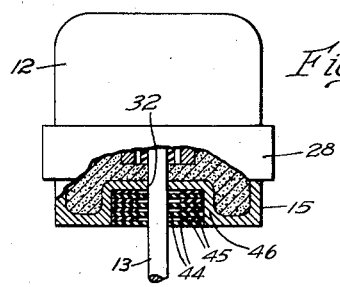
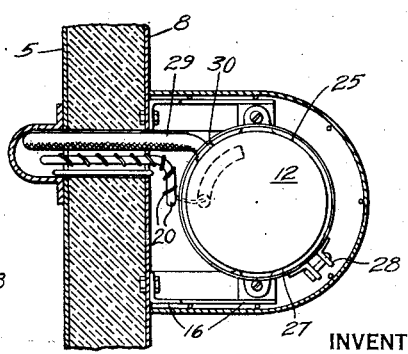
INVENTOR
*Elo C. Tanner.*
BY
*O. D. Buchanan*
ATTORNEY Patented Aug. 19, 1941

2,253,404

UNITED STATES PATENT OFFICE 2,253,404

SUBMERSIBLE ELECTRIC MOTOR

Elo C. Tanner, Springfield, Mass., assignor to Westinghouse Electric & Manufacturing Company, East Pittsburgh, Pa., a corporation of Pennsylvania Application June 30, 1939, Serial No. 282,159

4 Claims. (Cl. 172—36)

My invention relates to submersible electric motors, and it has particular relation to the improvement of a motor having a depending shaft which extends downwardly into a cold liquid-bath in a storage-compartment for bottled beverages, the bottom end of the motor-shaft terminating in a propeller-means for circulating the liquid in said bath. In such motor-applications, it sometimes happens that too much water, or other liquid-bath, is carelessly put into the storage-compartment, so that when the storage-compartment is filled with bottled beverages, the water-level of the liquid-bath rises above its normal level, which is below the motor-proper, so that the water-bath partially submerges the motor. Such a motor is also subjected to a certain amount of splashing of the liquid-bath when the liquid cooler is moved from one place to another.

A liquid-cooler motor of the type of which my present invention is an improvement, is described and claimed in a patent to Robert H. Tull and myself, No. 2,128,784, granted August 30, 1938.

The principal object of my invention is to provide improvements for such a motor, for preventing damage to the electrical and mechanical parts due to accidental submersion or splashing of the liquid-bath.

With the foregoing object, and other objects in view, my invention consists in the parts, elements, combinations, methods and systems hereinafter described and claimed, and illustrated in the accompanying drawing, wherein:

Figure 1 is a vertical cross-sectional view through a liquid cooler embodying my present invention;

Fig. 2 is a transverse enlarged sectional view thereof, on the plane indicated by the line II—II of Fig. 1;

Fig. 3 is a top plan view of the motor, on the line indicated at III—III in Fig. 2; and Fig. 4 is an elevational view, with parts broken away, illustrating a modification.

Referring particularly to Figs. 1 and 2, I show my invention applied to a liquid cooler, or refrigerator-cabinet, 5, which comprises an upper storage-compartment 6 and a lower apparatus-compartment 7. The storage-compartment 6 comprises a heat-insulated tank 8 containing a liquid-bath 9 in which beverage-bottles 11 are placed.

In the upper portion of this compartment, above the normal level of the liquid-bath 9, there is also disposed an electric motor 12 (Fig. 2) which has a rotatable shaft 13 extending a considerable distance downwardly below the motor, said shaft terminating, at its lower end, in a propeller 14 which is disposed near the bottom of the tank 8 for agitating the liquid 9. The motor is provided with a mounting-base 15 which is supported from wall-brackets 16 mounted within the beverage-compartment 6. Disposed in spaced relation to the motor-shaft 13, between the motor-proper 12 and the propeller 14, is some spiral tubing 17 which constitutes the cooler-element of a mechanical refrigerating system. The apparatus-compartment 7 contains the principal portion of the refrigerating system, including a motor-compressor unit 18, a condenser 19, conduits 20 for the refrigerating fluid, and a fan 21 for cooling the condenser.

In accordance with my present invention, I provide means for protecting the motor 12 against splashing of the liquid-bath 9, as when the liquid cooler is being moved, and also for protecting the electric motor against abnormal operating-conditions in which the water-level of the liquid-bath 9 may be raised to some excessive height, as indicated at 23 in Fig. 1, so that the motor would then be operating partially submerged.

In the preferred form of my invention, which is illustrated in Fig. 2, the mounting-base 15 of the motor is provided with a substantially cylindrical outer surface-portion 24, which cooperates with the bottom end of a hollow, inverted cup-like, substantially air-tight shell 25 which is mounted on said mounting-base 15 so as to enclose all parts of the motor 12 above said mounting-base. The shell 25 terminates in a substantially cylindrical extension 26 of the substantially cylindrical outer surface-portion 24 of the mounting-base 15, and the joint between the cylindrical surface-portions 24 and 26 is covered, and sealed, by a ring-member 27 of rubber or other soft, resilient material, which is hermetically sealed to both the shell 25 and the base 15. A clamp 28 is also provided, encircling the rubber ring 27, so as to clamp it firmly in place.

As shown in Fig. 3, the motor-leads 29 pass through the shell 25 with an air-tight junction, as shown at 30.

In the form of my invention shown in Fig. 2, the motor 12 is also provided with a depending tubular shield 31, the top of which is sealed, in air-tight fashion, to the mounting-base 15 so as to surround the bearing-opening 32 in said mounting-base. The side walls of the depending tubular shield 31 are impervious to liquid and are spaced from the upper portion of the depending shaft 13.

The particular motor which is shown in Fig. 2 is provided with an oil-thrower 33 which is disposed immediately above the opening 32 in the mounting-base 15, and the oil-thrower 33 is surmounted by a guard 34 which bounds a wick-filled oil-chamber 35. The motor 12 is also provided, externally, with a guarding shell or enclosure 36 having an open bottom-end 37 and having a large opening 38 in its side walls at a point below the motor 12, said opening being covered by wire-screening 39. The cooling coil 17 of the refrigerating system is disposed underneath the motor 12, and within the lower portion of the guarding shell 36. The propeller 14, on the bottom of the motor-shaft 13, is disposed below the bottom of the guarding shell 36.

In operation, the rotation of the propeller 14 causes a centrifugal movement of the liquid of the cooling bath 9, away from the bottom end of the motor-shaft 13, so that the cooling liquid is driven away from the bottom end of the motor shaft, and returns to the shaft, through the guard-opening 38, at points near the top of the liquid-bath 9, as indicated by the arrows in Fig. 1.

The effect of my hermetically sealed shell 26 and tube 31 is to entrap the air within the air-tight enclosure which is thus provided, the bottom end of the tube 31 being immersed in the liquid-bath 9 and providing an effective liquid-trap or water-seal, as indicated at 41. If, now, there should be a rise in the liquid-level 9, the entrapped air will prevent the liquid-trap level 41 from rising as high as the mounting-base 15 of the motor, so that the electrical insulation of the motor is not electrically damaged by the water and the metal parts are not mechanically damaged by rust.

In its fundamental basic principles, my invention is not limited to the precise forms of the bell-shaped shell 25 or of the depending tube 31, as other means may be utilized for performing an equivalent function, or a partially equivalent function.

Fig. 4 shows a modified form of embodiment in which the depending tube 31 is replaced by a nest of washers 44 which are spaced by other washers 45 having larger openings than the washers 44. These washers are disposed in a pocket or depression 46 which is formed in the bottom of the mounting-base 15, around its shaft-receiving opening 32. The small central openings in the washers 44 have a small clearance with the motor-shaft 13 so as to provide a series of labyrinth chambers which very considerably retard the rate at which water will rise around the shaft 13, when subjected to a slight pressure-head of a few centimeters. The means which is shown in Fig. 4 is, therefore, quite satisfactory to take care of all splashing conditions, and of only temporary periods of operation with the lower portion of the motor partially immersed in liquid.

While I have shown my invention, and described the underlying principles thereof, in connection with two illustrative forms of embodiment, I desire it to be distinctly understood that these precise forms of embodiment are intended to be only illustrative, particularly as to the broader aspects of my invention, as many changes in details may be made by the skilled workers of the art without departing from the essential spirit of the invention. I desire, therefore, that the appended claims shall be accorded the broadest construction consistent with their language and the prior art.

I claim as my invention:

1. A submersible electric motor having a rotatable shaft extending a considerable distance downwardly below the motor, said motor having a mounting-base having a substantially cylindrical outer surface-portion, a hollow, inverted, cup-like, substantially air-tight shell mounted on said mounting-base and enclosing all parts of said motor above said mounting-base, said shell including a substantially air-tight means for bringing the motor-leads therethrough, said shell terminating in a substantially cylindrical extension of said substantially cylindrical outer surface-portion of said mounting-base, a soft, resilient ring-member covering the joint between said shell and said base and hermetically sealed to both said shell and said base, and means surrounding the shaft at said bottom-opening for impeding or preventing the entrance of liquid into the motor.

2. A submersible electric motor having a rotatable shaft extending a considerable distance downwardly below the motor, said motor having a mounting-base having a substantially cylindrical outer surface-portion, a hollow, inverted, cup-like, substantially air-tight shell mounted on said mounting-base and enclosing all parts of said motor above said mounting-base, said shell including a substantially air-tight means for bringing the motor-leads therethrough, said shell terminating in a substantially cylindrical extension of said substantially cylindrical outer surface-portion of said mounting-base, a soft, resilient ring-member covering the joint between said shell and said base, a clamp encircling said ring-member, and means surrounding the shaft at said bottom-opening for impeding or preventing the entrance of liquid into the motor.

3. A submersible electric motor having a rotatable shaft extending a considerable distance downwardly below the motor, said motor having a mounting-base having a substantially cylindrical outer surface-portion, a hollow, inverted, cup-like, substantially air-tight shell mounted on said mounting-base and enclosing all parts of said motor above said mounting-base, said shell including a substantially air-tight means for bringing the motor-leads therethrough, said shell terminating in a substantially cylindrical extension of said substantially cylindrical outer surface-portion of said mounting-base, a soft, resilient ring-member covering the joint between said shell and said base and hermetically sealed to both said shell and said base, a depending tube hermetically joined, at its upper end, to said mounting-base in a position around said bottom-opening, said depending tube having impervious walls encircling, and spaced from, the upper portion of said downwardly extending portion of the shaft, and a tool disposed at the lower end of the shaft below said tube.

4. A submersible electric motor having a rotatable shaft extending a considerable distance downwardly below the motor, said motor having a mounting-base having a substantially cylindrical outer surface-portion, a hollow, inverted, cup-like, substantially air-tight shell mounted on said mounting-base and enclosing all parts of said motor above said mounting-base, said shell including a substantially air-tight means for bringing the motor-leads therethrough, said shell terminating in a substantially cylindrical extension of said substantially cylindrical outer surface-portion of said mounting-base, a soft, resilient ring-member covering the joint between said shell and said base, a clamp encircling said ring-member, a depending tube hermetically joined, at its upper end, to said mounting-base in a position around said bottom-opening, said depending tube having impervious walls encircling, and spaced from, the upper portion of said downwardly extending portion of the shaft, and a tool disposed at the lower end of the shaft below said tube.

ELO C. TANNER.